(12) United States Patent
Morgan et al.

(10) Patent No.: US 8,757,209 B2
(45) Date of Patent: Jun. 24, 2014

(54) OVERMOLDED OR PRESSED-IN SLEEVE FOR HYDRAULIC ROUTING OF SOLENOID

(75) Inventors: Kenneth W. Morgan, Lake Orion, MI (US); Michael E. Jones, Lake Orion, MI (US)

(73) Assignee: BorgWarner, Inc., Auburn Hills, MI (US)

( * ) Notice: Subject to any disclaimer, the term of this patent is extended or adjusted under 35 U.S.C. 154(b) by 687 days.

(21) Appl. No.: 12/988,811

(22) PCT Filed: Apr. 2, 2009

(86) PCT No.: PCT/US2009/039287
§ 371 (c)(1),
(2), (4) Date: Dec. 20, 2010

(87) PCT Pub. No.: WO2009/134579
PCT Pub. Date: Nov. 5, 2009

(65) Prior Publication Data
US 2011/0089352 A1   Apr. 21, 2011

Related U.S. Application Data

(60) Provisional application No. 61/125,703, filed on Apr. 28, 2008.

(51) Int. Cl.
*F16K 11/07* (2006.01)
*F16K 31/06* (2006.01)

(52) U.S. Cl.
USPC ................. 137/625.68; 137/625.65; 251/366

(58) Field of Classification Search
USPC .............. 137/625.65, 625.68; 251/366, 129.2
See application file for complete search history.

(56) References Cited

U.S. PATENT DOCUMENTS

| | | | | |
|---|---|---|---|---|
| 2,522,249 A * | 9/1950 | Baker | | 251/129.2 |
| 3,271,845 A * | 9/1966 | Breher | | 29/890.127 |
| 3,574,311 A * | 4/1971 | Fairbanks | | 137/625.68 |
| 3,643,700 A * | 2/1972 | Black | | 137/625.68 |
| 3,927,830 A * | 12/1975 | Briski | | 137/625.68 |
| 3,952,996 A * | 4/1976 | Hart | | 137/625.69 |
| 4,538,645 A * | 9/1985 | Perach | | 137/625.65 |
| 4,790,513 A * | 12/1988 | Davis et al. | | 137/625.65 |
| 4,988,077 A * | 1/1991 | Conley et al. | | 251/366 |
| 5,269,490 A * | 12/1993 | Fujikawa et al. | | 137/625.65 |
| 5,358,215 A * | 10/1994 | Buth et al. | | 251/129.21 |
| 5,518,029 A * | 5/1996 | Schumacher et al. | | 137/625.65 |
| 5,551,482 A * | 9/1996 | Dixon et al. | | 137/625.65 |
| 5,615,860 A * | 4/1997 | Brehm et al. | | 137/625.65 |
| 5,778,932 A * | 7/1998 | Alexander | | 137/625.65 |

(Continued)

FOREIGN PATENT DOCUMENTS

JP   55163582   11/1980
JP   61-141878   6/1986

(Continued)

*Primary Examiner* — John Rivell
(74) *Attorney, Agent, or Firm* — Warn Partners, P.C.

(57) ABSTRACT

A valve having a metal insert with a fluid passage formed in the metal insert. A composite valve body is disposed at least partially around the metal insert and having at least one port in fluid communication with the fluid passage with the metal insert. A valve member is partially disposed in the metal insert and operable to control the fluid flow through the fluid passage of the metal insert and parts of the valve body.

5 Claims, 2 Drawing Sheets

(56) References Cited

U.S. PATENT DOCUMENTS

| | | | |
|---|---|---|---|
| 6,012,700 A * | 1/2000 | Johnson et al. | 137/625.65 |
| 6,336,470 B1 * | 1/2002 | Zapf | 137/625.65 |
| 6,880,800 B2 * | 4/2005 | Zweigle et al. | 137/625.25 |
| 7,766,040 B2 * | 8/2010 | Bamber | 137/625.26 |
| 2003/0201020 A1 * | 10/2003 | Kulmann | 137/625.69 |
| 2004/0173269 A1 * | 9/2004 | Fleischer et al. | 137/625.65 |
| 2010/0139795 A1 | 6/2010 | Holmes et al. | |

FOREIGN PATENT DOCUMENTS

| | | |
|---|---|---|
| JP | 10-222237 | 8/1998 |
| JP | 11087133 | 3/1999 |
| JP | 2000-357016 | 12/2000 |
| WO | WO 99/24721 | 5/1999 |

* cited by examiner

US 8,757,209 B2

OVERMOLDED OR PRESSED-IN SLEEVE FOR HYDRAULIC ROUTING OF SOLENOID

This application is a National Stage of International Application No. PCT/US2009/039287, filed Apr. 2, 2009. This application claims priority to U.S. Provisional Patent Application No. 61/125,703 filed on Apr. 28, 2008. The disclosure of the above applications is incorporated herein by reference.

FIELD OF THE INVENTION

The present invention relates to overmolded solenoid valve bodies, and more specially solenoid valves having metal sleeves pressed in or overmolded to a composite valve body.

BACKGROUND OF THE INVENTION

Solenoid valves for automotive components have become common place in the industry. The solenoid valves are used to control various hydraulic components such as transmission, clutch, turbocharger, drive line components, and exhaust control components. Typically, solenoid valves have a valve body that is actuated by a solenoid portion which consists of an electromagnetic coil having an armature that moves in response to the application of current to the electromagnetic portion. In the past the valve bodies have been made out of machined metal components. The flow path through the valve body has been defined by forming holes and bores in the metal valve body. The trend in solenoid designs has been to increase their ability through the use of more complex flow paths through the valve body itself. Thus, there is an increased need for more comprehensive fluid passages in the valve body in order to make the solenoid valve more versatile and keep up with the performance demands that exist in the industry. Additionally, suppliers have an interest in being able to manufacture solenoid valves in a more cost effective manner to be able to offer the marketplace a lower cost, higher performance product.

SUMMARY OF THE INVENTION

The present invention relates to a valve having a metal insert with a fluid passage formed in the metal insert. A composite valve body is disposed at least partially around the metal insert and having at least one port in fluid communication with the fluid passage of the metal insert. A valve member is partially disposed in the metal insert and operable to control the fluid flow through the fluid passage of the metal insert and parts of the valve body.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

The following description of the preferred embodiment(s) is merely exemplary in nature and is in no way intended to limit the invention, its application, or uses.

The following description of the preferred embodiment(s) is merely exemplary in nature and is in no way intended to limit the invention, its application, or uses.

Figure 1:
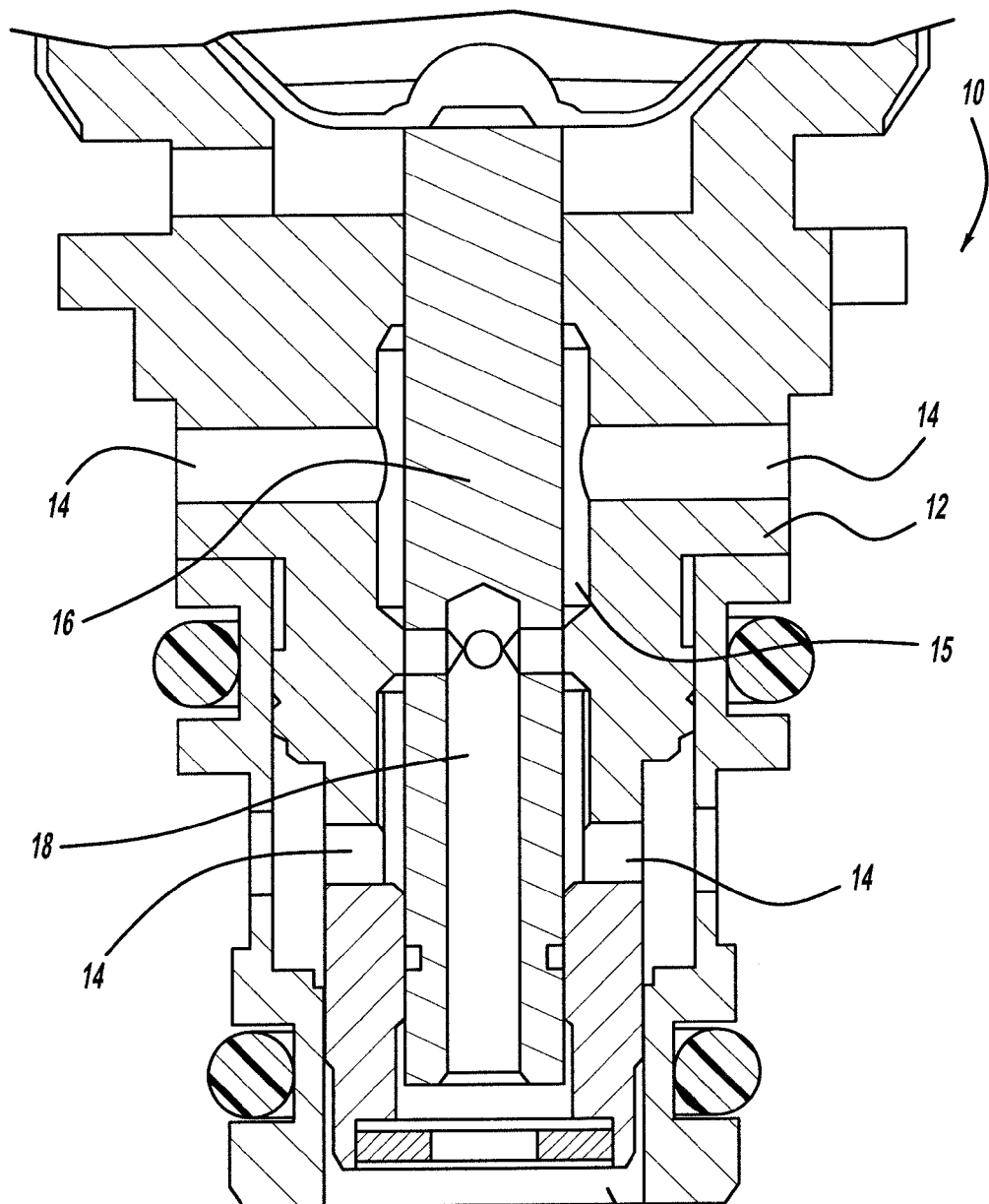
FIG. 1 is a cross-sectional plan view of a prior art valve portion.

Referring now to FIG. 1, a prior art solenoid valve assembly 10 is shown. The valve assembly 10 has a metal valve body 12 having machined ports 14 which are typically formed in the metal valve body 12 by boring or milling through the metal valve body 12. The machined ports 14 extend into a machined bore 15 which is also formed in the metal valve body 12. A valve member 16 is slideably positioned within the machined bore 15 of the metal valve body 12. The valve member 16 has a fluid passage 18 that is used to communicate fluid between the machined ports.

Figure 2:
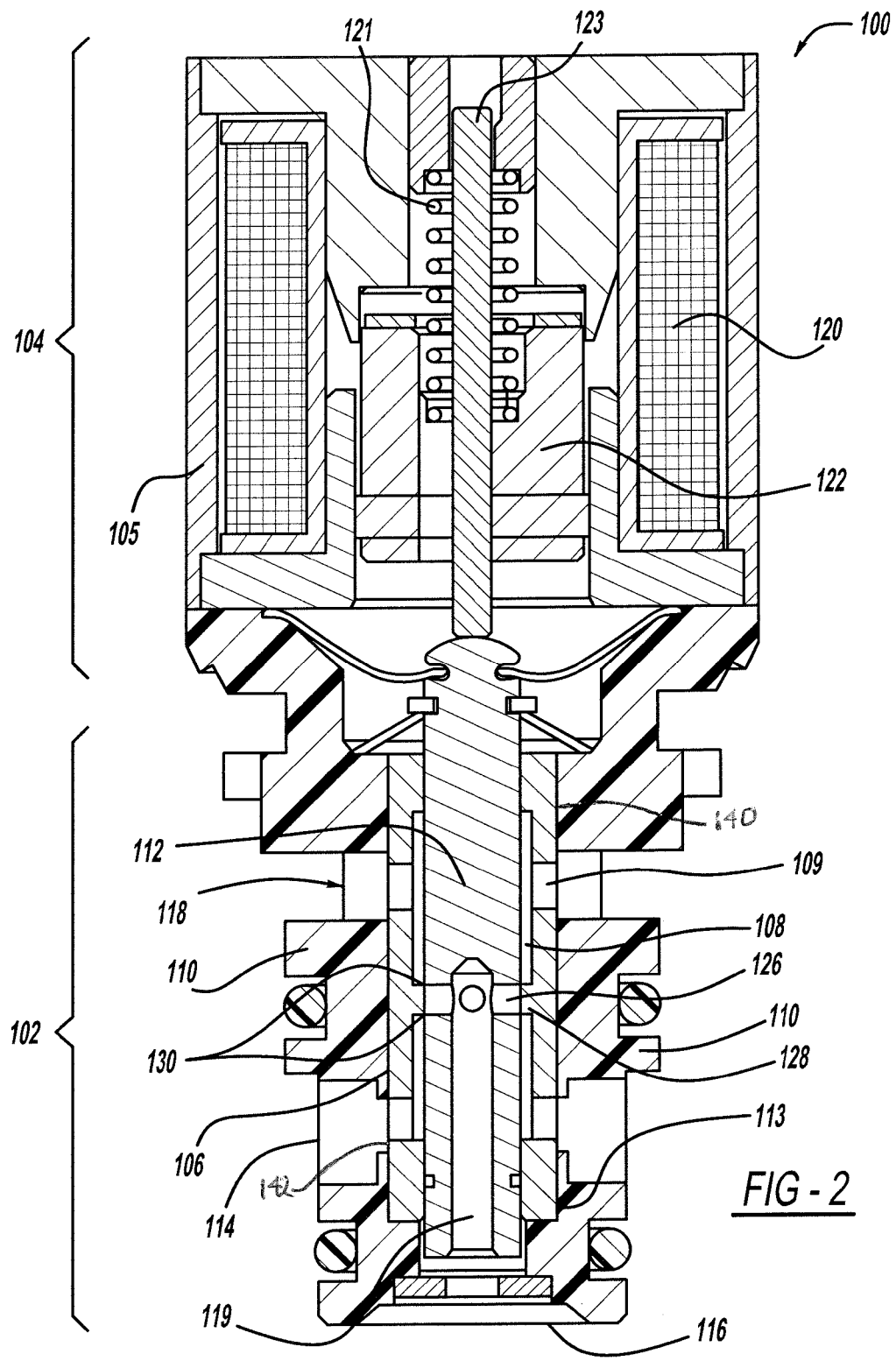
FIG. 2 is a cross-sectional plan view in accordance with a present embodiment of the invention.

FIG. 2 is a cross-sectional view of a composite pressure control solenoid valve assembly 100 in accordance with the present embodiment of the invention. The valve assembly 100 has a valve portion 102 and a solenoid actuator portion 104. The actuator portion 104 and valve portion 102 can be separate. The valve portion 102 has a composite valve body 110 that is made of a composite material which is molded from composite resin. The composite material that makes up the composite body 110 would be any type of suitable plastic material. More specifically, thermal plastics such as polyamids, including nylon, polyphthalamides, and liquid crystal polymers. However, the principle materials used are not necessarily limited to these particular materials, other plastic materials may be more suitable for a particular application.

The composite valve body 110 has one or more ports molded therein. In this particular embodiment, the one or more ports include a supply port 114, control port 116, and exhaust port 118. Each of the ports 114, 116, 118 extend to a bore of the composite valve body 110. The bore of the valve body 113 is formed through the molding process or processes described below. Additionally, the greater of lesser numbers of ports can be implemented based on the design of a particular application.

Within the bore 113 of the composite valve body 110 is a metal insert 106. A fluid passage 108 with several apertures 109 that extend from the exterior of the metal insert 106 to the fluid passage 108 are formed in the metal insert 106. The fluid passage 108 is formed by machining the metal insert 106. The metal insert 106 is positioned in the bore 113 of the composite valve body 110. The metal insert 106 can be placed within the bore 113 of the composite valve body 110 by overmolding the composite valve body 110 around the metal insert 106. Another process involves press fitting the metal insert 106 into the already formed valve body 110.

The apertures 109 of the metal insert 106 are configured to align with one or more of the ports 114, 116, 118 of the composite valve body 110. This allows for fluid communication from outside of the composite valve body 110 to flow into the fluid passage 108 of the metal insert 106.

A spool valve member 112 is slideably positioned within the metal insert 106 and has a fluid passage 119 formed therein. The fluid passage 119 in this particular embodiment communicates with the control port 116 and the supply port 114 and exhaust port 118 through metering orifices 126. The metal insert has upper and lower bearings 140,142 aligning the spool valve 112. The metal insert 106 has metering lands 128 formed in the fluid passage 108 of the metal insert 106. The metering lands 128 align with the metering orifices 126 and function to control the flow of fluid through the metering orifices 126 when the valve member 112 is placed in a position where the metering orifices 126 are aligned with the metering lands 128. The metering lands 128 have upper and lower flat metering edges 130 that permit the flow of fluid through the metering orifices 126 when the valve member 112 is moved axially within the fluid passage 108 of the metal insert 106.

The valve assembly 100 of the present embodiment significantly reduces the production cost and manufacturing time when compared to the prior art valve of FIG. 1. The composite valve body 110 is less expensive and easier to form than the metal valve body 12. The metal insert 106 and the valve member 112 are the only components that have to be machined. These components are smaller and present less metal that has to be machined. Additionally, the valve member 112 and metal inset 106 can be preassembled and checked for quality prior to being placed in the composite valve body 110. This also saves time and even allows the metal insert 106 and valve member 112 to be manufactured separately which also presents cost savings.

The valve assembly 100 has an actuator portion 104 which in the present embodiment of the invention is a solenoid portion. Within the actuator portion 104 is a coil 120 that when energized causes an armature 122 to move axially. A pin 123 is connected to the armature 122 and contacts the valve member 112 of the valve portion 102 in order to cause the valve member 112 to move axially within the metal insert 106. A spring 121 is operably connected to the pin 123 for biasing the armature 122 in one direction when the coil 120 is not energized.

The present invention provides a composite valve body 110 that is formed by molding composite resins. This lowers the over all cost of production and also provides the advantage of being able to form more complex fluid passages within the composite valve body 110 while eliminating the machining step that would normally be required for a metal valve body 12 as shown in FIG. 1. Furthermore, there are fluid passages that can be molded into the composite valve body 110 that could not be easily formed in a traditional metal valve body 12.

The present invention also includes a method of making a composite solenoid valve or valve assembly 100 as shown in FIG. 2. The method of making the valve assembly 100 includes providing the metal insert 106, composite valve body 110, valve member 112, fluid passage 119 of the valve member 112, and at least one port 114, 116, 118 in the composite valve body 110 and apertures 109 in the metal insert 106.

The valve member 112 also has fluid passages 119 and apertures 126 machined or formed by machining and boring the passages out of the valve member 112. While the present invention describes a valve member 112 that is formed of metal it is within the scope of this invention to have the valve member 112 also formed from composite material whereby the fluid passages and apertures are formed through a molding process. The valve member 112 has been placed in the fluid passage 108 of the metal insert 106.

The valve member 112 is then placed in a slidable arrangement within the fluid passage 108 of the metal insert 106. The metal insert 106 is then connected to the composite valve body 110. This process can be carried out in several different ways. One process is to press fit the metal insert 106 into an already formed composite valve body 110. Another step involves placing the metal insert 106 into a mold and then overmolding the composite valve body 110 around the metal insert 106. The supply port 114, control port 116, and exhaust port 118 are formed in the composite valve body 110 either through the overmolding process or by drilling the ports through the formed composite valve body 110. The metal insert 106 may have a stepped or mold feature on its exterior surface such that in order to more tightly secure the metal insert 106 to the valve body 110. Such features will eliminate any possible leaking that can occur between the plastic and the metal and also to insure retention of the metal insert.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. A solenoid pressure control valve comprising:
    a metal insert having a fluid passage formed in said metal insert with upper and lower internal bearings;
    a composite valve body disposed at least partially around said metal insert;
    a supply port disposed through said composite valve body and said metal insert, wherein said supply port is connected to said fluid passage;
    a control port disposed through said composite valve body and said metal insert, said control port being connected to said fluid passage;
    an exhaust port disposed through said composite valve body and said metal insert, said exhaust port being connected to said fluid passage;
    a spool valve member at least partially disposed and aligned in said metal insert for controlling the flow of fluid medium between said supply port and said control port, wherein said valve member has a bore extending at least partially through said valve member for providing flow between said supply port and said control port;
    two or more metering orifices extending through said valve member between said bore and said fluid passage;
    metering lands positioned between upper and lower bearings, said metering lands having upper and lower flat metering edges engaged to said metering orifices, wherein said valve member controls the flow of fluid between said control port and either said supply port or said exhaust port by moving with respect to said metering lands;
    a solenoid portion having a coil with an armature moveable within said solenoid portion in response to the energization of said coil, wherein said armature is operably configured to contact said valve member and causes said valve member to slide within said fluid passage; and
    a spring operably connected to said armature for biasing said armature in one direction when said coil is not energized.

2. The solenoid pressure control valve of claim 1, wherein said composite valve body is composed of a thermoplastics material.

3. A method of making a solenoid pressure control valve comprising:
    providing a metal insert having a fluid passage formed in said metal insert with upper and lower internal bearings;
    providing a composite valve body disposed at least partially around said metal insert;

providing a supply port disposed through said composite valve body and said metal insert, wherein said supply port is connected to said fluid passage;

providing a control port disposed through said composite valve body and said metal insert, said control port being connected to said fluid passage;

providing an exhaust port disposed through said composite valve body and said metal insert, said exhaust port being connected to said fluid passage;

providing a spool valve member at least partially disposed and aligned in said metal insert for controlling the flow of fluid medium between said supply port and said control port, wherein said valve member is a bore extending at least partially through said valve member for providing flow between said supply port and said control port;

providing two or more metering orifices extending through said valve member between said bore and said fluid passage;

providing a metering lands positioned between said upper and lower bearings, said metering lands having upper and lower flat metering edges engaged to said metering orifices, wherein said valve member controls the flow of fluid between said control port and either said supply port or said exhaust port by moving with respect to said metering lands; and providing a solenoid portion having a coil with an armature moveable within said solenoid portion in response to the energization of said coil, wherein said armature is operably configured to contact said valve member and causes said valve member to slide within said fluid passage in response to energization of said solenoid portion; and providing a spring operably connected to said armature for biasing said armature in one direction when said coil is not energized.

4. The method of claim 3 wherein said step of providing a composite valve body disposed at least partially around said metal insert is accomplished one of the following:
   overmolding said composite valve body around said metal insert; and
   press-fitting said metal insert into said composite valve body.

5. The method of claim 3, wherein said composite valve body is composed of a thermoplastics material.

* * * * *